United States Patent
Soua (10) Patent No.: US 9,071,165 B2
(45) Date of Patent: Jun. 30, 2015

(54) 2N+1 LEVEL VOLTAGE INVERTER

(75) Inventor: Samir Soua, Antony (FR)

(73) Assignee: GE Energy Power Conversion Technology Limited, Warwickshire (GB)

(*) Notice: Subject to any disclaimer, the term of this patent is extended or adjusted under 35 U.S.C. 154(b) by 0 days.

(21) Appl. No.: 13/474,649

(22) Filed: May 17, 2012

(65) Prior Publication Data
US 2013/0044526 A1 Feb. 21, 2013

(30) Foreign Application Priority Data
May 17, 2011 (FR) ...................................... 11 54283

(51) Int. Cl.
*H02M 7/537* (2006.01)
*H02M 7/487* (2007.01)

(52) U.S. Cl.
CPC ..................................... *H02M 7/487* (2013.01)

(58) Field of Classification Search
CPC ................................................... H02M 7/487
USPC ............. 363/131, 17, 51, 132, 55, 57, 98, 41, 363/138, 97, 133, 134, 95, 136, 137, 37, 39, 363/123, 126, 35, 36, 56.01, 56.02
See application file for complete search history.

(56) References Cited

U.S. PATENT DOCUMENTS

| 6,278,626 | B1* | 8/2001 | Teichmann | 363/135 |
| 6,995,994 | B2* | 2/2006 | Bijlenga et al. | 363/51 |
| 2004/0095790 | A1* | 5/2004 | Bakran et al. | 363/132 |

OTHER PUBLICATIONS

French search report and opinion for application No. 1154283 dated Jan. 23, 2012.

* cited by examiner

*Primary Examiner* — Gary L Laxton
*Assistant Examiner* — Trinh Dang
(74) *Attorney, Agent, or Firm* — Parks Wood LLC; Stephen J. Terrell (57) ABSTRACT

This system for converting a direct input voltage into an alternating output voltage comprises two input terminals, two voltage generators connected in series between the input terminals and connected to one another by a middle point, as well as, for each phase of the alternating voltage, an output terminal, two switching branches each connected between the output terminal and a respective input terminal, each switching branch comprising N first switching cells connected in series and N−1 intermediate points, the first switching cells successively being connected to one another by a corresponding intermediate point, N being an integer greater than or equal to 2, and control means for controlling the first switching cells. The system includes, for each phase of the alternating voltage, N−1 pair(s) of capacitors, each pair of capacitors being connected between intermediate points of one of the two switching branches and the other of the two switching branches.

20 Claims, 9 Drawing Sheets

2N+1 LEVEL VOLTAGE INVERTER

CROSS-REFERENCE TO RELATED APPLICATIONS

This application claims benefit of French patent application number 1154283, filed May 17, 2011, which is herein incorporated by reference.

FIELD OF THE INVENTION

The present invention relates to a system for converting a direct input voltage into an alternating output voltage comprising at least one phase, the system including:
two input terminals,
two voltage generators connected in series between the input terminals and connected to one another by a middle point,
for the or each phase of the output voltage:
an output terminal,
two switching branches each connected between the output terminal and a respective input terminal, each switching branch comprising N first switching cells connected in series and N−1 intermediate points, the first switching cells successively being connected to one another by a corresponding intermediate point, N being an integer greater than or equal to 2, and
control means for controlling the first switching cells.

The present invention in particular relates to voltage inverters with 2N+1 levels, where N is an integer greater than or equal to 2. Such voltage inverters with a large number of output voltage levels have several advantages relative to voltage inverters with two or three levels, such as a reduction of the harmonic distortion of the alternating output voltage and a decrease in the isolation stresses at the electric engine intended to be powered by the inverter.

The present invention in particular applies to conversion systems having a high electrical power, such as a power above 100 kW.

BACKGROUND OF THE INVENTION

Figure 1:
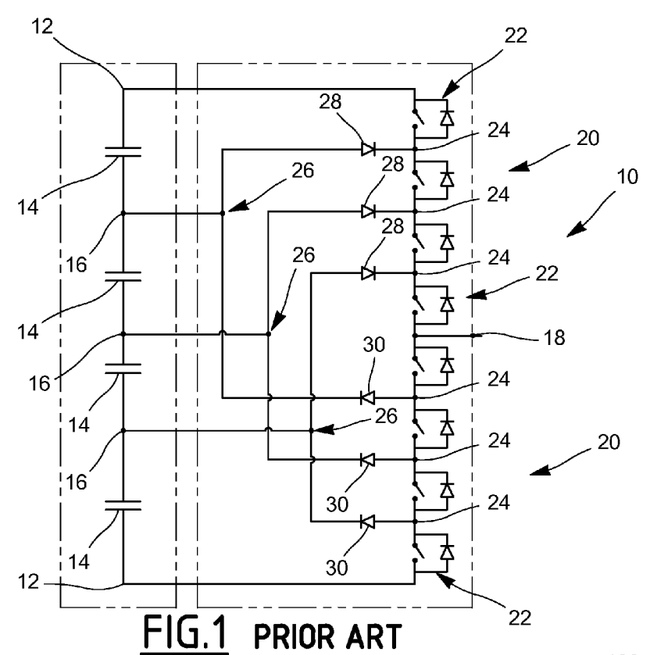
FIG. 1, already described, is an electrical diagram of a conversion system of a known type.

A conversion system of the aforementioned type is known. FIG. 1 illustrates such a conversion system.

In FIG. 1, the conversion system 10 is a voltage inverter with five output levels, and comprises two input terminals 12, four capacitors 14 connected in series between the input terminals 12 and connected to one another in pairs via a respective middle point 16. The conversion system 10 also comprises, for the or each phase of the output voltage, an output terminal 18 and two switching branches 20 each connected between the output terminal 18 and a respective input terminal 12. Each switching branch comprises four switching cells 22 connected in series and three intermediate points 24, the switching cells 22 being successively connected to one another by a corresponding intermediate point 24.

The conversion system 10 also includes three intermediate branches 26 each connected to a respective middle point 16 and comprising two diodes 28, 30. The first diode 28 is directly connected between said respective middle point 16 and a corresponding intermediate point of one of the two switching branches 20, the second diode 30 being inversely connected between said respective middle point 16 and an intermediate point 24 of the other of the two switching branches 20. The conversion system 10 also includes a means, not shown, for controlling the switching cells 22.

Such a conversion system is likely to involve electric charge imbalances at the middle points 16, which then causes a dissymmetry of the voltage and current at the output of the conversion system. The conversion system then generally includes means for balancing the voltage at the terminals of each of the capacitors, such as equilibration means by adding a homopolar component with a shared mode on each of the phases of the alternating output current, the shift between the phases making it possible to charge or discharge the capacitors.

However, such equilibration means are effective when the amplitude of the alternating voltage is below a threshold value substantially equal to one quarter of the value of the direct input voltage, and do not allow correct equilibration when the amplitude of the alternating output current is above said aforementioned value. Furthermore, such equilibration means cause excess costs.

The aim of the invention is to propose a conversion system making it possible to reduce the voltage imbalance at middle points irrespective of the voltage and current delivered by the conversion system, while not requiring additional means for balancing the voltage at the terminals of the capacitors.

BRIEF SUMMARY OF THE INVENTION

To that end, the invention relates to a conversion system of the aforementioned type, characterized in that it also includes, for the or each phase of the output voltage:
N−1 pairs of capacitors, each pair of capacitors being connected between an intermediate point of one of the two switching branches and an intermediate point of the other of the two switching branches, the two capacitors of each pair being connected to one another by a middle point,
N second switching cells, one among the N second cells being connected between the output terminal and a middle point, and each of the N−1 other second cell(s) being connected between two middle points, and
means for controlling the second switching cells.

According to other embodiments, the conversion system includes one or more of the following features, considered alone or according to all technically possible combinations:
the control means are capable of controlling the switching of the first and second corresponding cells according to a control law, and the control law is such that the current flows, for at least one given value of the alternating output voltage, through a corresponding capacitor in one direction during a first phase, then in the other direction during a second phase;
each first switching cell comprises at least one first bidirectional current switch;
the first switches of the two switching branches are connected in series and in the same direction between the two output terminals;
each first switch comprises a transistor and a diode connected in anti-parallel relative to the transistor;
each second switching cell is bidirectional in current and voltage;
each second switching cell comprises at least two second switches connected in opposite series;
each second switch comprises a transistor and a diode that are connected in anti-parallel relative to the transistor;
each second switching cell comprises two second switches connected in anti-parallel; and
each second switch comprises at least one diode, a transistor connected in series with the diode, and another diode connected in anti-parallel relative to the transistor.

BRIEF DESCRIPTION OF THE DRAWINGS

These features and advantages of the invention will appear upon reading the following description, provided solely as an example, and done in reference to the appended drawings, in which.

DETAILED DESCRIPTION OF THE PREFERRED EMBODIMENT

The present invention relates to a system for converting a direct input voltage into an alternating output voltage comprising at least one phase having 2N+1 levels, where N is an integer greater than or equal to 2. The conversion system is for example a voltage inverter with 2N+1 levels. The alternating voltage is, for example, periodic.

The conversion system is intended to supply a charge with a voltage comprising a phase and having a high value, for example greater than 1000 V. The charge has a high electrical power, for example greater than 100 kW. The charge is, for example, a three-phase electric motor.

Figure 2:
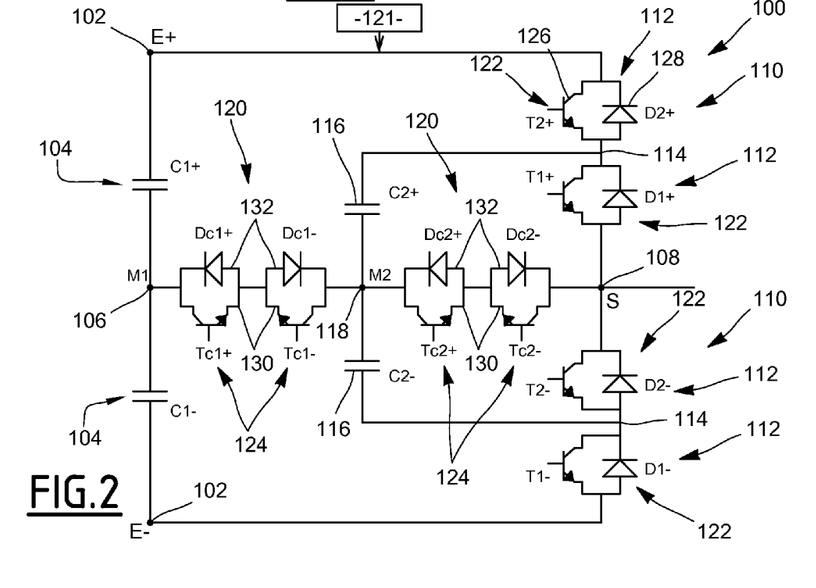
FIG. 2 is an electrical diagram of a conversion system according to a first embodiment.

FIG. 2 shows a first embodiment of the voltage conversion system 100 with 2N+1 levels, with N equal to 2, or five levels.

The conversion system 100 includes two input terminals 102, i.e. a positive terminal denoted E+ and a negative terminal denoted E−, and two voltage generators 104 connected in series between the input terminals 102 and connected to one another by a middle point 106, also denoted M1.

The conversion system 100 includes, for the or each phase of the output voltage, only one phase being shown in FIG. 2, an output terminal 108, also denoted S, and two switching branches 110 each connected between the output terminal 108 and a respective input terminal 102. Each switching branch 110 comprises two first switching cells 112 connected in series and an intermediate point 114, the first two cells 112 being connected to one another by the intermediate point 114.

The conversion system 100 also includes, for the or each phase of the output voltage, a pair of capacitors 116, each pair of capacitors 116 being connected between an intermediate point 114 of one of the two switching branches and an intermediate point 114 of the other of the two switching branches, the two capacitors 116 of the pair being connected to one another by a middle point 118, also denoted M2.

The conversion system 100 also includes, for the or each phase of the output voltage, two second switching cells 120, one second cell 120 being connected between the output terminal 108 and the middle point 118, and the other second cell 120 being connected between the middle points 106, 118.

The conversion system 100 includes means 121 for controlling the first switching cells 112 and second switching cells 120.

The conversion system 100 is, for example, a three-phase inverter, and then comprises three output terminals 108, six switching branches 110, three pairs of capacitors 116 and six second switching cells 120.

The two voltage generators 104 connected between the input terminals 102 are identical, and for example each comprise a capacitor. The capacitors of the voltage generators 104 have a capacity of the same value. The capacitor connected to the positive input terminal is denoted C1+, and the capacitor connected to the negative input terminal is denoted C1−.

The switching branch 110 connected to the positive input terminal E+ will hereafter be called the positive switching branch, and the switching branch 110 connected to the negative input terminal E− will hereafter by called negative switching branch.

Each first switching cell 112 comprises at least one first bidirectional current switch 122. In the embodiment of FIG. 2, each first switching cell 112 is made up of a first switch 122. Alternatively, each first switching cell 112 comprises a plurality of first switches 122 connected to one another in series.

The two capacitors 116 of the pair of capacitors connected between the intermediate points 114 are identical, and therefore have a capacity of the same value. The capacitor 116 connected to the intermediate point 114 of the positive switching branch is denoted C2+, the capacitor 116 connected to the intermediate point 114 of the negative switching branch is denoted C2−.

Each second switching cell 120 is current- and voltage-directional.

Each second switching cell 120 comprises at least two second switches 124 connected in opposite series, as shown in FIG. 2. In the embodiment of FIG. 2, each second switching cell 120 is made up of two second switches 124 connected in opposite series.

Alternatively, not shown, each second switching cell 120 comprises two second switches connected in opposite series.

The control means 121 are capable of controlling the switching of the corresponding first and second cells 112, 120 according to a control law. The control law is such that the current flows, for at least one given value of the alternating output voltage, through a corresponding capacitor 116 in one direction during a first phase, then in the other direction during a second phase, so as to balance the voltage at the terminals of the capacitor 116. The control law has a switching frequency of the first and second cells 112, 120.

The first switches 122 of the two switching branches are connected in series and in the same direction between the two input terminals 102. Each first switch 122 for example comprises a transistor 126 and a diode 128 connected in antiparallel relative to the transistor 126. Alternatively, each first switch 122 comprises a thyristor and a diode, not shown, the diode being connected in antiparallel relative to the thyristor.

Each second switch 124 comprises, when the two switches are connected in opposite series within a second switching cell 120, a transistor 130 and a diode 132 connected in antiparallel relative to the transistor 130, as shown in FIG. 2. Alternatively, each second switch 124 comprises, when the two switches are connected in opposite series with a second switching cell 120, a thyristor and a diode, not shown, the diode being connected in anti-parallel relative to the thyristor.

Alternatively, not shown, each second switch comprises, when the second switches are connected in antiparallel within a second switching cell 120, at least one diode, a transistor connected in series with the diode, and another diode connected in anti-parallel relative to the transistor. Alternatively, each second switch 124 comprises, when the second switches are connected in anti-parallel within a second switching cell 120, a thyristor and a diode, not shown, the diode being connected in series relative to the thyristor.

The transistors 126 of the first switches, and the transistors connected in opposite series or in anti-parallel with the second switches 124 are, for example, IGBT (Insulated Gate Bipolar Transistor) transistors. Alternatively, said transistors are IEGT (Injection Enhanced Gate Transistor) transistors.

Alternatively, the thyristors of the first and second switches 122, 124 are GTO (Gate Turn-Off) thyristors, or GCT (Gate Controlled Thyristor) thyristors.

The transistors 126 of the positive switching branch are respectively denoted T1+, T2+, and the transistors 126 of the negative switching branch are respectively denoted T1−, T2−.

The diodes 128 connected in anti-parallel relative to the transistors T1+, respectively T2+, are denoted D1+, respectively D2+. By analogy, the diodes 128 connected in anti-parallel relative to the transistors T1−, T2−, respectively, are denoted D1, D2−, respectively.

The transistors 130 are identical. The transistors 130 of a same second switching cell 120 are controlled at the same time by the control means 121.

The transistors 130 of the second switching cell connected between the middle points 106, 118 are connected in opposite series, and respectively denoted Tc1+ and Tc1−. The transistors 130 of the second switching cell connected between the middle point 118 and the output terminal 108 are also connected in opposite series, and respectively denoted Tc2+, Tc2−.

The diodes 132 connected in anti-parallel relative to the transistors Tc1+, Tc1−, respectively, are denoted Dc1+, Dc1−, respectively. By analogy, the diodes 132 connected in anti-parallel relative to the transistors denoted Tc2+, Tc2−, respectively, are denoted Dc2+, Dc2−, respectively.

The operation of the conversion system according to the invention will henceforth be explained using FIGS. 3 to 16.

The conversion system 100 is bidirectional. In other words, the electric current can circulate from the input terminals 102 toward the output terminal(s) 108, the conversion system 100 then operating as an inverter, and conversely the current can also flow from the output terminal(s) 108 toward the input terminals 102, the conversion system 100 then operating as a rectifier.

FIGS. 3 to 16 illustrate the conduction sequence of the transistors and the diodes of the first switches 122 and the second switches 124 of the five-level conversion system 100. More specifically, FIGS. 3 to 9 illustrate the conduction sequence when the current through the output terminal 108 is positive, i.e. when it flows from a respective input terminal 102 toward the output terminal 108. Complementarily, FIGS. 10 to 16 illustrate the conduction sequence when the current through the output terminal 108 is negative, i.e. when it flows from the output terminal 108 toward the respective input terminal 102.

In FIGS. 3 to 16, the path followed by the electric current is shown by the bold lines.

Figure 3:
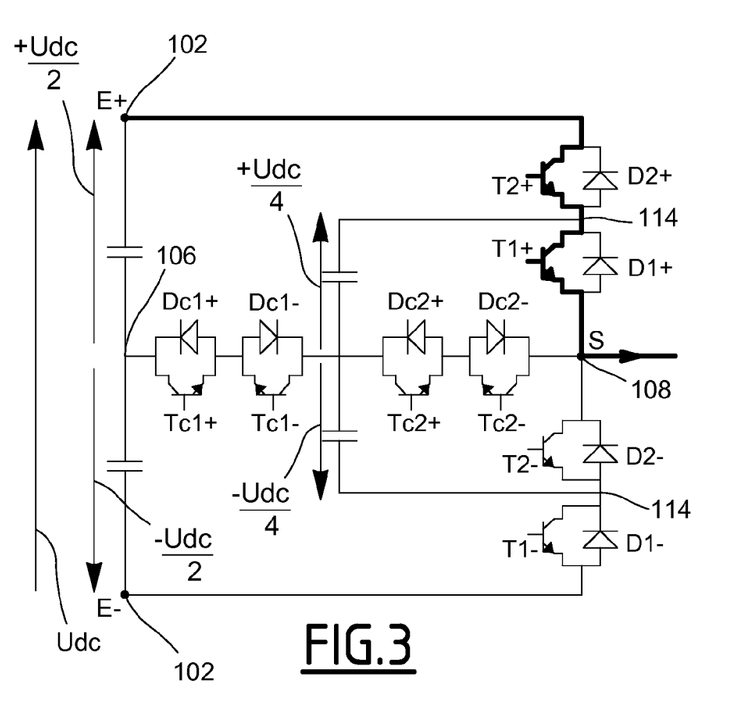
FIGS. 3 to 16 are diagrams illustrating the operation of the conversion system of FIG. 2.

The direct voltage between the input terminals 102 is denoted Udc, as shown in FIG. 3. The voltage between the middle point 106 and the positive input terminal E+ is then equal to +Udc/2, and the voltage between the middle point 106 and the negative input terminal E− is then equal to −Udc/2.

The capacitors 116 are initially charged at a voltage equal to Udc/4. In other words, the voltage between the middle point 118 and the intermediate point 114 of the positive switching branch is initially equal to +Udc/4, and the voltage between the middle point 118 and the intermediate point 114 of the negative switching branch is initially equal to −Udc/4.

The switching states of the conversion system 100 when the latter is operating as an inverter and when the current flows from a respective input terminal 102 or the middle point 106 toward the output terminal 108, will now be described using FIGS. 3 to 9.

Figure 4:
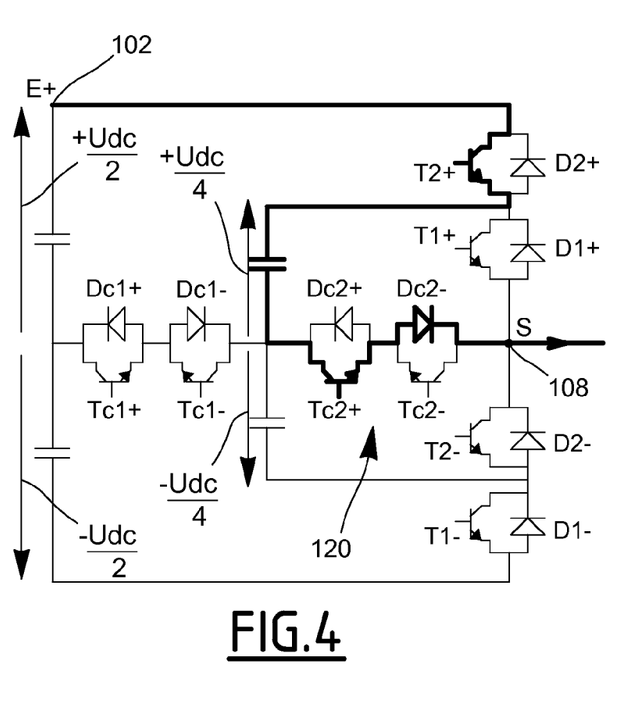
Figure 5:
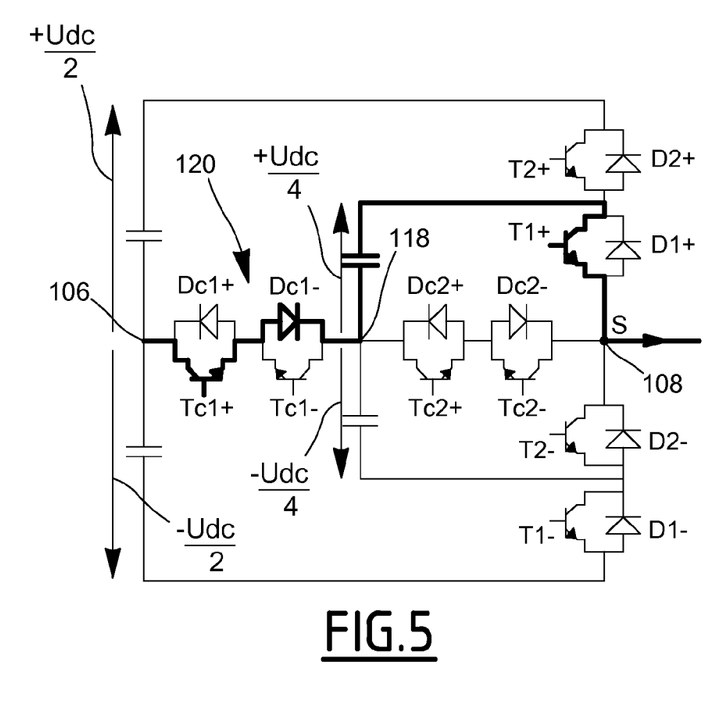
Figure 6:
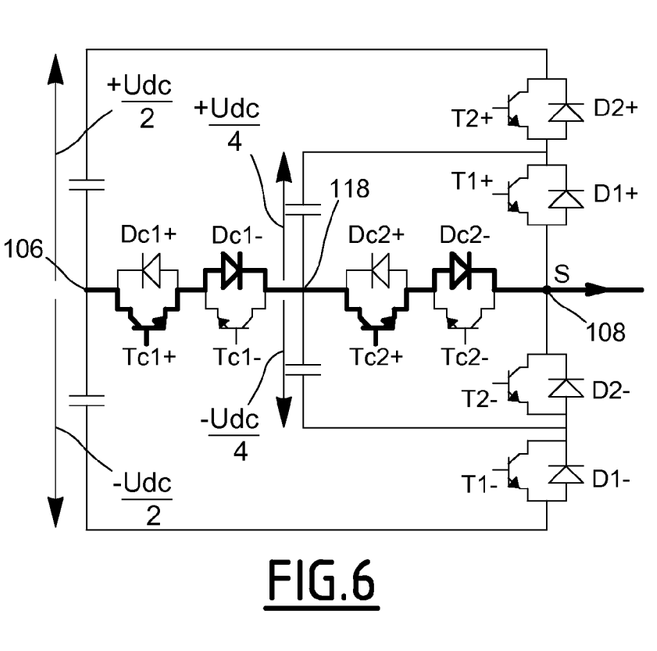
Figure 7:
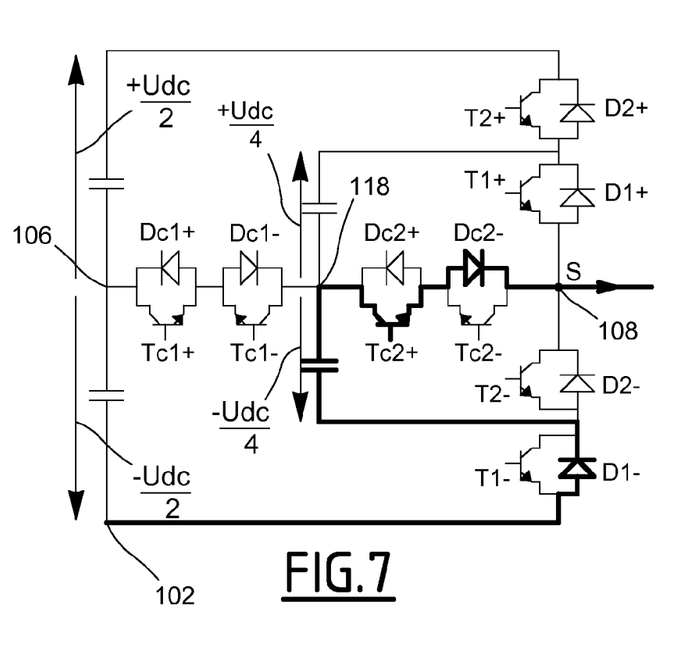
Figure 8:
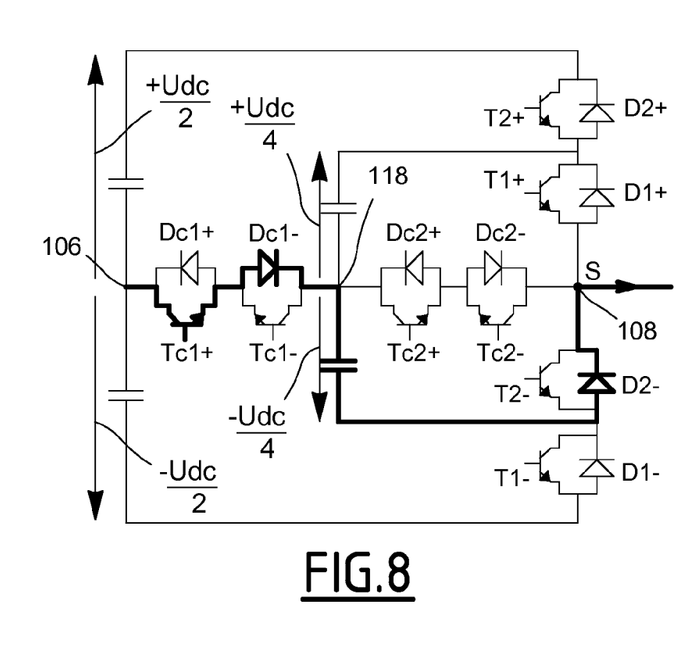

FIGS. 3 to 9 illustrate successive states for which the voltage delivered at the output of the conversion system varies, during a first half-period, from +Udc/2 to −Udc/2, by a Udc/4 pitch, with FIGS. 4 and 5 corresponding to a same output voltage equal to +Udc/4 and FIGS. 7 and 8 corresponding to a same output voltage equal to −Udc/4 depending on whether the current is flowing in one or the other of the second switching cells 120. One skilled in the art will understand that the variation of the output voltage during the second half-period is obtained by symmetry, the voltage varying from −Udc/2 to +Udc/2, by Udc/4 pitch.

In FIG. 3, the current flows from the positive input terminal E+ through the transistors T1+ and T2+ to the output terminal S, and the delivered voltage is then equal to +Udc/2.

In FIG. 4, the current flows from the positive input terminal E+ toward the output terminal 108 through the transistor T2+, the capacitor C2+ and the second switching cell 120 connected between the middle point 118 and the output terminal 108, via the transistor Tc2+ and the diode Dc2− of the second cell, and the output voltage is then equal to +Udc/4.

In FIG. 5, the delivered output voltage is also equal to +Udc/4, but in that case the current flows from the middle point 106 toward the output terminal 108 through the transistor Tc1+, the diode Dc1−, the capacitor C2+ and the transistor T1+.

The states of FIGS. 4 and 5 are therefore redundant regarding the value of the output voltage. The state of FIG. 4 corresponds to a positive current through the capacitor C2+, and the state of FIG. 5 corresponds to a negative current through the capacitor C2+.

In other words, the control law is such that the current flows, for the given value +Udc/4 of the alternating output voltage, through the capacitor C2+ in one direction during a first phase shown in FIG. 4, then in the other direction during a second phase shown in FIG. 5.

In this way, the average current through the capacitor C2+ is zero over an equilibration period, which makes it possible to reduce the charge imbalances at the terminals of this capacitor C2+ and to have an average voltage at the terminals of the capacitor C2+ substantially equal to +Udc/4 between the middle point 118 and the intermediate point 114 of the positive switching branch.

The equilibration period is, for example, the period of the alternating voltage. Alternatively, the equilibration period is the half-period of the alternating voltage. Also alternatively, the equilibration period is the switching period, i.e. the opposite of the switching frequency of the control law.

In FIG. 6, the delivered output voltage is zero, the current flowing from the middle point 106 toward the output terminal 108 through the transistor Tc1+, the diode Dc1−, the transistor Tc2+ and the diode Dc2−. In other words, the current flows from the middle point 106 at the zero potential through the two second switching cells 120 and without passing through a capacitor 116 such that the voltage is zero.

In FIG. 7, the current flows from the negative input terminal toward the output terminal 108 through the diode D1−, the capacitor C2−, and the transistor Tc2+ and the diode Dc2− of the second switching cell 120 connected between the middle point 118 and the output terminal 108. The delivered voltage is then equal to −Udc/4.

In FIG. 8, the delivered voltage is also equal to −Udc/4, but the current flows through a different path, from the middle point 106 toward the output terminal 108 through the transistor Tc1+ and the diode Dc1− of the second switching cell 120 connected between the middle points 106, 118, the capacitor C2− and the diode D2−.

The states of FIGS. 7 and 8 are also redundant regarding the value of the output voltage. The difference between these two states is related to the flow direction of the current in the capacitor C2−, the current through the capacitor C2− being positive in the state of FIG. 7 and negative in that of FIG. 8. This redundancy also has the advantage of having a zero average current through the capacitor C2− over the equilibration period, and having an average voltage at the terminals of the capacitor C2− substantially equal to −Udc/4 between the middle point 118 and the intermediate point 114 of the negative switching branch.

In other words, the control law is such that the current flows, for the given value −Udc/4 of the alternating output voltage, through the capacitor C2− in one direction during a first phase shown in FIG. 7, then in the other direction during a second phase shown in FIG. 8.

Figure 9:
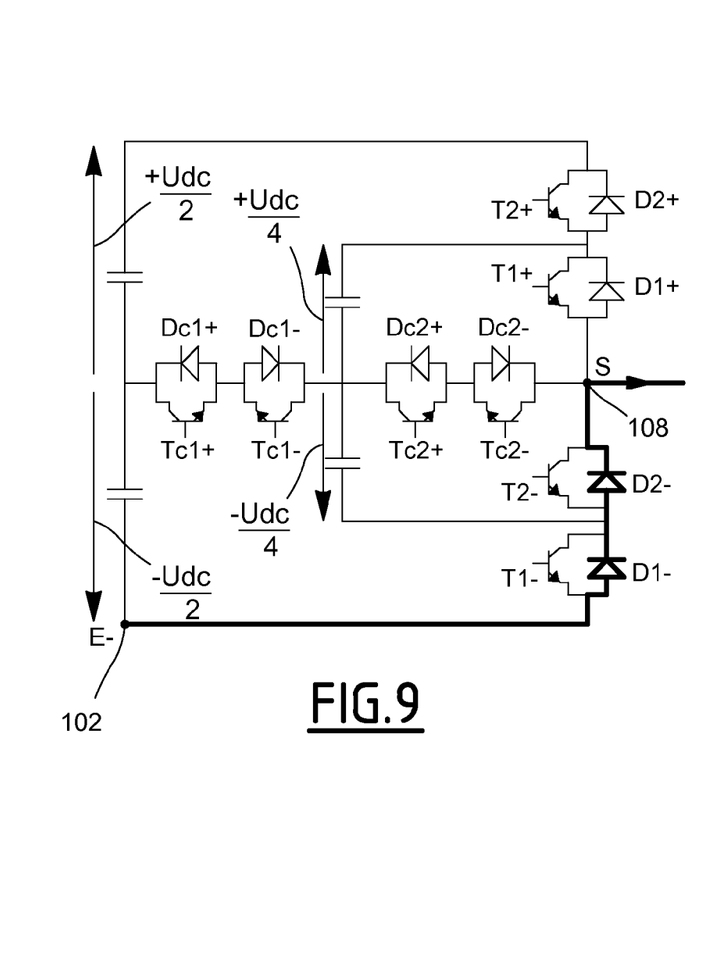

FIG. 9 corresponds to the last switching state when the conversion system 100 is operating as an inverter and the current flows from an input terminal E+, E− or the middle point 106 toward the output terminal S. In FIG. 9, the current flows from the negative input terminal E− to the output terminal S through the diodes D1− and D2−, and the output voltage is then equal to −Udc/2.

The switching states of the conversion system 100 when the latter is operating as a rectifier and the current is flowing from the output terminal 108 toward the input terminals 102 or the middle point 106 will now be described using FIGS. 10 to 16.

Figure 10:
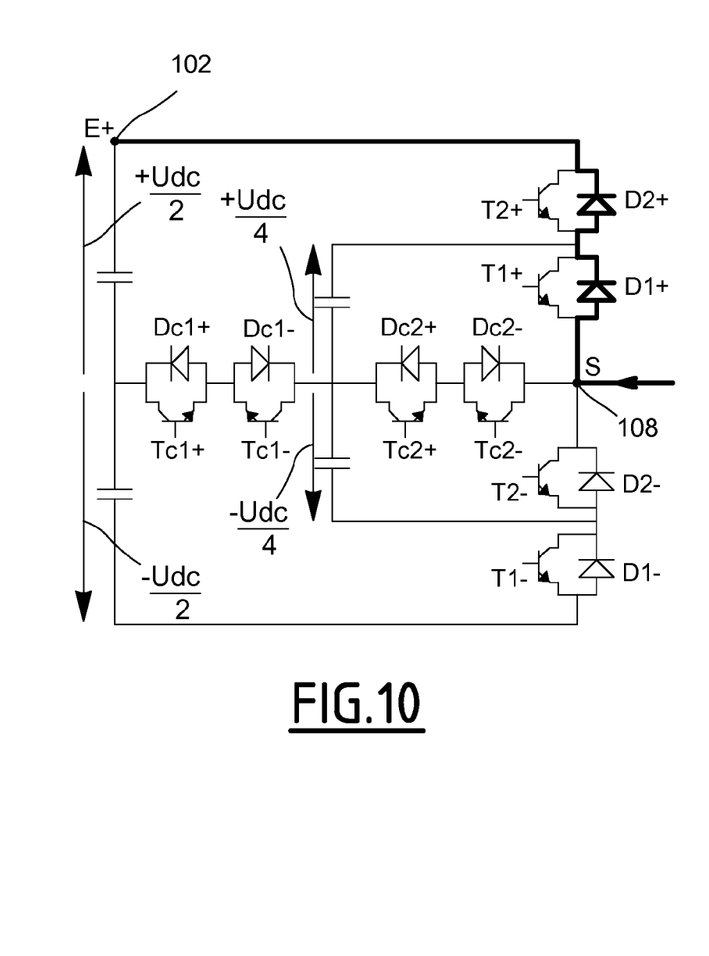
Figure 11:
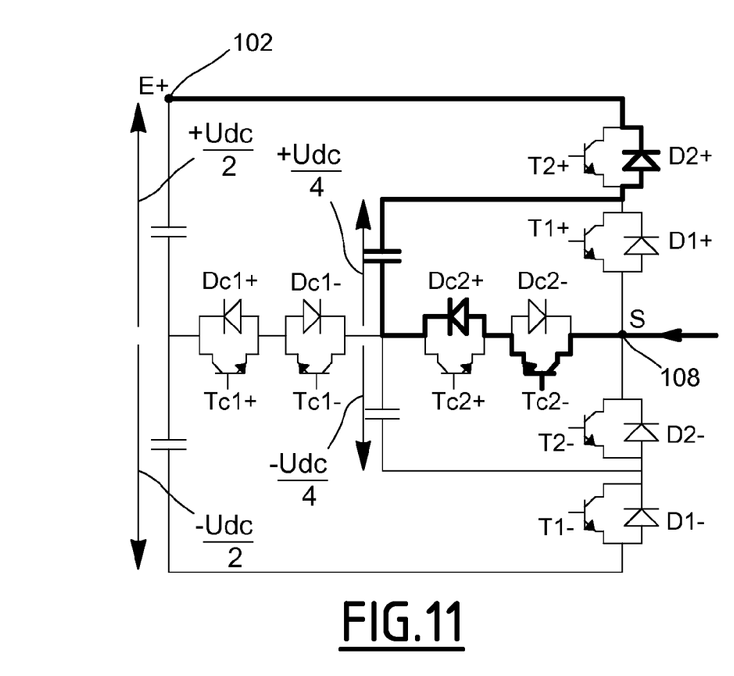
Figure 12:
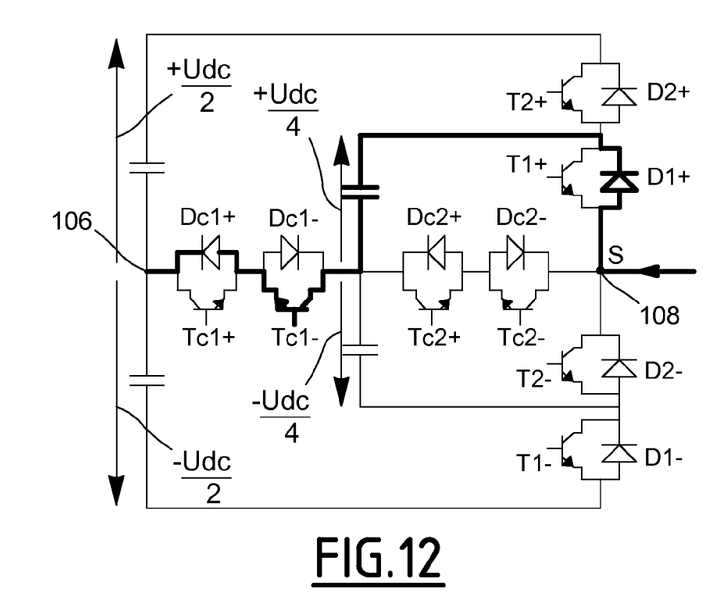
Figure 13:
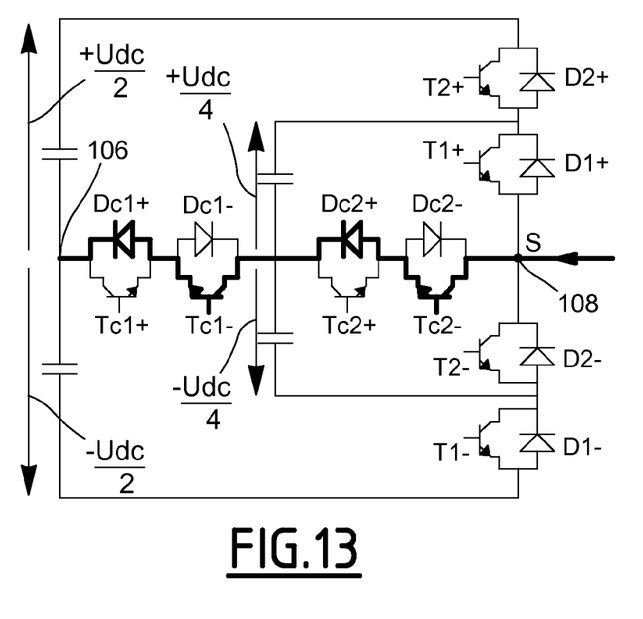
Figure 14:
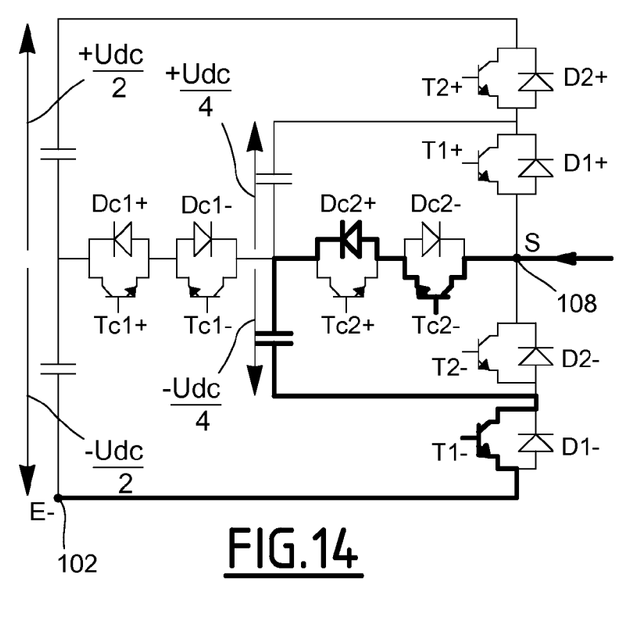
Figure 15:
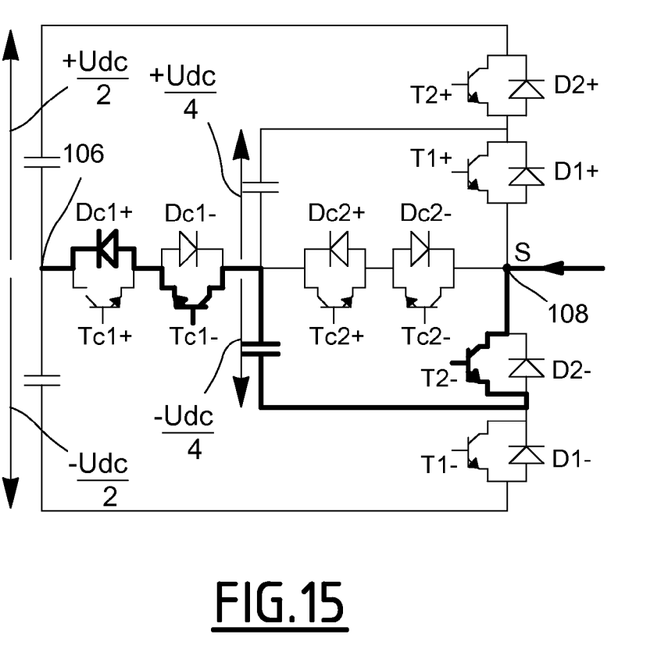

FIGS. 10 to 16 illustrate the successive states for which the alternating voltage varies, during a first half-period, from +Udc/2 to −Udc/2, by Udc/4 pitch, with FIGS. 11 and 12 corresponding to a same alternating voltage equal to +Udc/4 and FIGS. 14 and 15 corresponding to a same alternating voltage equal to −Udc/4 depending on whether the current flows in one or the other of the two switching cells 120. One skilled in the art will understand that the variation of the output voltage during the second half-period is obtained by symmetry, the voltage varying from −Udc/2 to +Udc/2, by Udc/4 pitch.

In FIG. 10, the current through the output terminal 108 is negative and flows from said terminal 108 toward the positive input terminal E+ through the diodes D1+ and D2+. The voltage is then equal to +Udc/2.

In FIG. 11, the current flows from the output terminal 108 toward the positive input terminal E+ through the second switching cell 120 connected between the middle point 118 and the output terminal 108 via the transistor Tc2− and the diode Dc2+, then through the capacitor C2+ and the diode D2+. The voltage is then equal to +Udc/4.

In FIG. 12, the voltage is also equal to +Udc/4, but the current flows along a different path, i.e. through the diode D1+, the capacitor C2+ and the second switching cell 120 connected between the middle points 106, 118, via the transistors Tc1− and the diode Dc1+.

The state of FIG. 12 is therefore redundant relative to that of FIG. 11 regarding the value of the voltage, and the difference between the two states corresponds to the direction of the flow of the current through the capacitor C2+, the current through the capacitor C2+ being positive in the state of FIG. 11 and negative in that of FIG. 12.

In other words, the control law is such that the current flows, for the given value +Udc/4 of the alternating voltage, through the capacitor C2+ in one direction during a first phase shown in FIG. 11, then in the other direction during a second phase shown in FIG. 12.

In FIG. 13, the current flows from the output terminal 108 toward the middle point 106 at the zero potential through the two second switching cells 120, such that the voltage is zero. More specifically, the current flows through the transistor Tc2− and the diode Dc2+, then through the transistor Tc1− and the diode Dc1+.

In FIG. 14, the current flows from the output terminal 108 toward the negative input terminal E− through the second switching cell 120 connected between the middle point 118 and the output terminal 108, via the transistor Tc2− and the diode Dc2+, then through the capacitor C2− and the transistor T1−. The voltage is equal to −Udc/4.

In FIG. 15, the voltage is also equal to −Udc/4, but the path followed by the current is different, the latter flowing through the transistor T2−, the capacitor C2− and the second switching cell 120 connected between the middle points 106, 118, via the transistor Tc1− and the diode Dc1+, from the output terminal 108 toward the middle point 106.

The state of FIG. 15 is also redundant relative to that of FIG. 14, and the difference between the two states corresponds to the flow direction of the current through the capacitor C2−, the current flowing in the capacitor C2− being positive in the state of FIG. 14 and negative in that of FIG. 15.

In other words, the control law is such that the current flows, for the given value −Udc/4 of the alternating voltage, through the capacitor C2− in one direction during a first phase shown in FIG. 14, then in the other direction during a second phase shown in FIG. 15.

Figure 16:
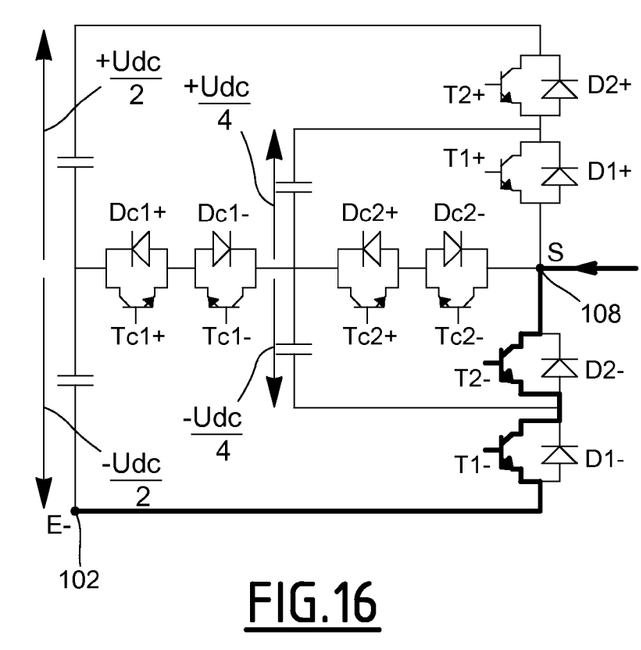

In FIG. 16, the current lastly flows from the terminal 108 toward the negative input terminal E− through the transistors T2− and T1−, so that the alternating voltage is equal to −Udc/2.

One skilled in the art will understand that the operation of the conversion system is similar when the first and second switches 122,124 include thyristors.

The bidirectional conversion system 100 according to the invention thus makes it possible to deliver a voltage with five levels in the embodiment of FIGS. 2 to 16, where the values assumed by the alternating voltage are equal to +Udc/2, +Udc/4, 0, −Udc/4, or −Udc/2, the direct voltage being equal to Udc.

The conversion system according to the invention makes it possible to reduce the charge imbalances at the middle point 118, due to the state redundancies for the voltages +Udc/4 and −Udc/4 making it possible to have a zero average current through the capacitors C2+ and C2− over the equilibration period. The conversion system also makes it possible to have an average voltage at the terminals of the capacitor C2+ substantially equal to +Udc/4 between the middle point 118 and the intermediate point 114 of the positive switching branch, and an average voltage at the terminals of the capacitor C2− that is substantially equal to −Udc/4 between the middle point 118 and the intermediate point 114 of the negative switching branch.

In the embodiment previously described using FIGS. 3 to 16, the control law is such that the state redundancies for the voltages +Udc/4 and −Udc/4 occur during each half-period of the alternating voltage. In other words, the equilibration period is the half-period of the alternating voltage.

Alternatively, the control law is such that the state redundancies for the voltages +Udc/4 and −Udc/4 occur during the period of the alternating voltage, a first state being implemented during the first half-period, and the corresponding redundant state being implemented during the second half-period. In other words, the equilibration period is the period of the alternating voltage.

One skilled in the art will also understand that the conversion system in which each first switching cell 112 comprises a plurality of first switches 122 makes it possible to deliver an output voltage with a higher value.

Alternatively, with an output voltage having an unchanged value, the conversion system in which each first switching cell 112 comprises a plurality of first switches 122 makes it possible to use components, i.e. transistors and diodes, having a lower usage voltage. Such lower usage voltage components are less expensive.

The second switching cells 120 do not include any electromagnetic coil. In other words, no electromagnetic coil is connected between the middle points M1 and M2 or between the middle point M2 and the output terminal 108.

Figure 17:
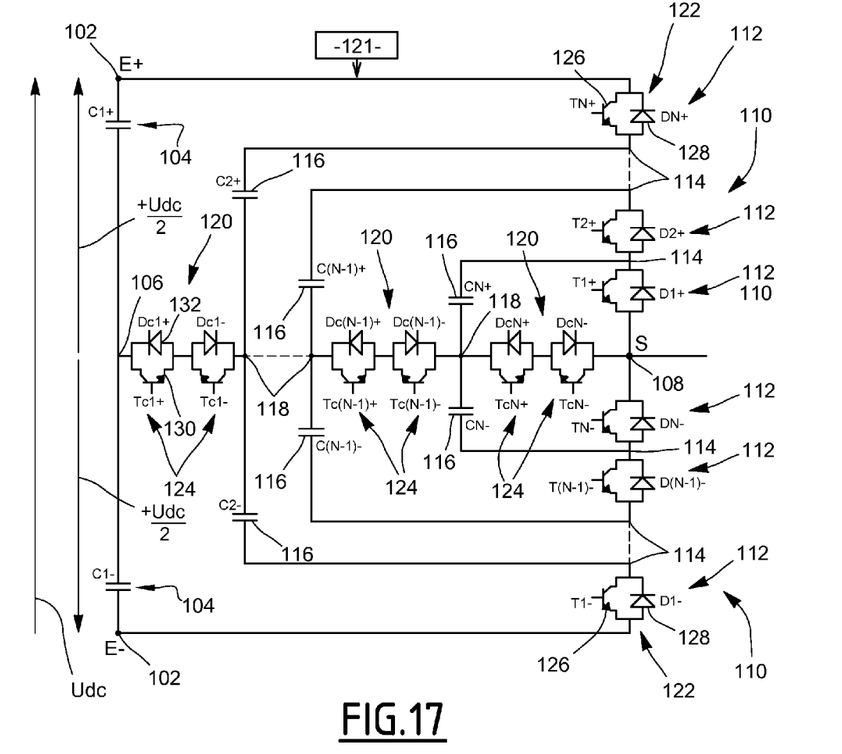
FIG. 17 is a view similar to that of FIG. 2 according to a second embodiment.

FIG. 17 illustrates a second embodiment of the invention for which the elements similar to the first embodiment, previously described, are referenced using identical references, and are not described again.

According to the second embodiment, the conversion system 100 has 2N+1 levels, where N is an integer greater than or equal to 2. The conversion system 100 is, for example, a 2N+1 level voltage inverter. In other words, the second embodiment is a generalization of the first embodiment for which N was equal to 2.

In FIG. 17, the conversion system 100 includes two input terminals 102, i.e. a positive terminal E+ and a negative terminal E−, and two voltage generators 104 connected in series between the input terminals 102 and connected to one another by a middle point 106.

The conversion system 100 includes, for the or each phase of the output voltage, an output terminal 108 and two switching branches 110 each connected between the output terminal 108 and a respective input terminal 102. Each switching branch 110 comprises N first switching cells 112 connected in series and N−1 intermediate points 114, the first switching cells 112 being successively connected to one another by a corresponding intermediate point 114.

The conversion system 100 also includes, for the or each phase of the output voltage, N−1 pair(s) of capacitors 116, each pair of capacitors 116 being connected between an intermediate point 114 of one of the two switching branches 110 and an intermediate point 114 of the other of the two switching branches 110, and the two capacitors 116 of each pair being connected to one another by a middle point 118.

The conversion system 100 also includes, for the or each phase of the output voltage, N second switching cells 120, one among the N second cells 120 being connected between the output terminal 108 and a middle point 118, and each of the N−1 other second cell(s) 120 being connected between two middle points 106, 118.

The conversion system 100 includes control means 121 for the first and second switching cells 112, 120.

Each first switching cell 112 comprises at least one first bidirectional switch 122. Alternatively, each first switching cell 112 comprises a plurality of first switches 122.

Each second switching cell 120 is current- and voltage-bidirectional.

Each second switching cell 120 comprises at least two second switches 124 connected in opposite series, as shown in FIG. 17. In the embodiment of FIG. 17, each second switching cell 120 is made up of two switches 124 connected in opposite series. Alternatively, not shown, each second switching cell 120 comprises a plurality of pairs of second switches 124 connected in opposite series.

Alternatively, not shown, each second switching cell 120 comprises two second switches connected in anti-parallel.

The control means 121 are able to control the switching of the corresponding first and second cells 112, 120 according to a control law. The control law is such that the current flows, for at least one given value of the alternating output voltage, through a corresponding capacitor 116 in one direction during a first phase, then in the other direction during a second phase. The control law has a switching frequency of the first and second cells 112, 120.

Thus, the average current through the corresponding capacitor 116 is zero over an equilibration period, which makes it possible to reduce charge imbalances at the terminals of the corresponding capacitor 116 and to have an average voltage at the terminals of the corresponding capacitor 116 substantially equal to Udc/4 in absolute value.

The control law is, for example, such that the first phase and the second phase are included in each half-period of the alternating voltage, the latter being periodic. In other words, the equilibration period is the half-period of the alternating voltage.

Alternatively, the control law is such that the first phase is included in the first half-period of the alternating voltage, and the second phase is included in the second half-period. In other words, the equilibration period is the period of the alternating voltage.

Also alternatively, the equilibration period is the switching period, i.e. the opposite of the switching frequency of the control law.

Each first switch 122 comprises a transistor 126 and a diode 128 connected in anti-parallel relative to the transistor 126. The transistors 126 are denoted Ti+ and the corresponding diodes 128 are denoted Di+, the index i varying between 1 and N in the embodiment of FIG. 17, where each first switching cell 112 is made up of a first bidirectional switch 122. Alternatively, each first switch 122 comprises a thyristor and a diode, not shown, the diode being connected in anti-parallel relative to the thyristor.

Each second switch 124 comprises a transistor 130 and a diode 132 connected in anti-parallel relative to the transistor 130 when the second switches 124 of each switching cell 120 are connected in opposite series. The two transistors 130 of each second switching cell are then connected in opposite series and denoted Tci+, Tci−, the index i varying between 1 and N in the embodiment of FIG. 17, where each second switching cell 120 is made up of two second switches 124 connected in opposite series. By analogy, the diodes 132 are denoted Dci+, Dci−, the index i also varying between 1 and N. Alternatively, each second switch 124 comprises, when the two switches are connected in opposite series within a second switching cell 120, a thyristor and a diode, not shown, the diode being connected in anti-parallel relative to the thyristor.

Alternatively, not shown, each second switch comprises at least one diode, a transistor connected in series relative to the diode and another diode connected in anti-parallel relative to the transistor, not shown, when the second switches of each second switching cell are connected in anti-parallel. Alternatively, each second switch 124 comprises, when the second switches are connected in anti-parallel within a second switching cell 120, a thyristor and a diode, not shown, the diode being connected in series relative to the thyristor.

During the operation of the conversion system 100 according to the second embodiment, the direct voltage between the input terminals 102 is equal to Udc, and the voltage at the terminals of the capacitor C1+ between the middle point 106 and the positive input terminal E+ is then equal to +Udc/2, the voltage at the terminals of the capacitor C1− between the middle point 106 and the negative input terminal E− being equal to −Udc/2.

The voltage at the terminals of the capacitors 116 denoted Ci+, Ci−, respectively, with i between 2 and N, is equal to +(N+1−i)×Udc/2N, equal to −(N+1−i)×Udc/2N, respectively. The voltage at the terminals of the capacitors 116 of the last pair of capacitors denoted CN+, CN−, respectively, is then equal to +Udc/2N, −Udc/2N, respectively, i being equal to N.

The operation of this second embodiment has state redundancies with the flowing current, for a same value of the alternating voltage, in one direction, then the other, through each of the capacitors 116 denoted Ci+, Ci−, respectively, of the N−1 pair(s) of capacitors, i being between 2 and N.

More specifically, the control law is such that the current flows, for the given value +(N+1−i)×Udc/2N, −(N+1−i)×Udc/2N, respectively, of the alternating voltage, through the capacitor Ci+, Ci−, respectively, in one direction during a first phase, then in the other direction during a second phase, i varying between 2 and N, and N being an integer greater than or equal to 2.

The operation of this second embodiment is also similar to that of the first embodiment, and is therefore not described again.

The average current through each of the capacitors 116 of the N−1 pair(s) of capacitors is zero over the equilibration period due to the state redundancies. The average voltage at the terminals of each of the capacitors 116 of the $i^{th}$ pair of capacitors is substantially equal to (N+1−i)×Udc/2N in absolute value, i being between 2 and N.

The other advantages of this second embodiment are similar to the first embodiment, and are therefore not described again.

The second switching cells 120 do not include any electromagnetic coil. In other words, no electromagnetic coil is connected between the middle points 106, 118 or between the middle point 118 and the output terminal 108.

It is thus evident that the conversion system 100 according to the invention makes it possible to reduce the voltage imbalance at middle points irrespective of the voltage and current delivered by the conversion system, while not requiring additional equilibration means for balancing the voltage at the terminals of the capacitors.

While the foregoing is directed to embodiments of the present invention, other and further embodiments of the invention may be devised without departing from the basic scope thereof, and the scope thereof is determined by the claims that follow.

The invention claimed is:

1. A bidirectional system for converting a direct input voltage into an alternating output voltage comprising at least one phase, the bidirectional system including:
   two input terminals,
   two voltage generators connected in series between the two input terminals and connected to one another by a first middle point,
   an output terminal,
   two switching branches, each of the two switching branches connected between the output terminal and a respective one of the two input terminals, each of the two switching branches comprising N first switching cells connected in series and having one of N−1 intermediate points between adjacent ones of the N first switching cells, N being an integer greater than or equal to 2,
   N−1 pairs of capacitors, a first capacitor of each of the N−1 pairs of capacitors being connected between one of the N−1 intermediate points of a first one of the two switching branches and one of N−1 second middle points, a second capacitor of each of the N−1 pairs of capacitors being connected between one of the N−1 intermediate points of a second one of the two switching branches and one of the N−1 second middle points, the first capacitor of each of the N−1 pairs of capacitors and the second capacitor of each of the N−1 pairs of capacitors being connected to one another by one of the N−1 second middle points,
   N second switching cells, one of the N second switching cells being connected between the output terminal and one of the N−1 second middle points, and each of the other of the N second switching cells being connected between two middle points, the two middle points including at least one of the N−1 second middle points, and
   control means for controlling the N first switching cells and the N second switching cells,
   wherein the control means is capable of controlling the switching of the N first switching cells and the N second switching cells according to a control law, and the control law is such that a current flows, for at least one given value of the alternating output voltage, through a first capacitor of a first pair of the N−1 pairs of capacitors in a first direction during a first phase, then in a second direction opposite the first direction through the first capacitor of the first pair of the N−1 pairs of capacitors during a second phase.

2. The bidirectional system according to claim 1, wherein each of the N first switching cells comprises at least one first bidirectional current switch.

3. The bidirectional system according to claim 1, wherein each of the N second switching cells is bidirectional in current and voltage.

4. The bidirectional system of claim 1, wherein the control law is such that an average current through the first capacitor of the N−1 pairs of capacitors is zero over an equilibration period.

5. The bidirectional system of claim 1, wherein each of the two voltage generators comprises a capacitor.

6. The bidirectional system of claim 1, wherein the control law is such that the current flows, for at least one given value of the alternating output voltage, through a second capacitor of the first pair of the N−1 pairs of capacitors in a third direction during a third phase, then in a fourth direction opposite the third direction through the same second capacitor during a fourth phase.

7. The bidirectional system of claim 1, wherein the first phase and the second phase have the same output voltage.

8. The bidirectional system of claim 1, wherein the current flows from a respective one of the two input terminals or the first middle point toward the output terminal.

9. The bidirectional system of claim 1, wherein the current flows from the output terminal toward a respective one of the two input terminals or the first middle point.

10. The bidirectional system of claim 1, wherein the system is configured to operate as an inverter.

11. The bidirectional system of claim 1, wherein the system is configured to operate as a rectifier.

12. The bidirectional system according to claim 2, wherein at least one first bidirectional current switch of one of the two switching branches and the first bidirectional current switch of the other of the two switching branches are connected in series and in the same direction between the two input terminals.

13. The bidirectional system according to claim 2, wherein at least one first bidirectional current switch comprises a transistor and a diode connected in anti-parallel relative to the transistor.

14. The bidirectional system according to claim 3, wherein each of the N second switching cells comprises at least two second switches connected in opposite series within the second switching cell.

15. The bidirectional system according to claim 3, wherein each of the N second switching cells comprises two second switches connected in anti-parallel within the second switching cell.

16. The bidirectional system of claim 4, wherein the equilibration period is a period of alternating voltage or a half-period of the alternating voltage.

17. The bidirectional system according to claim 14, wherein each of the N second switching cells comprises a transistor and a diode that are connected in anti-parallel relative to the transistor.

18. The bidirectional system according to claim 15, wherein each of the N second switching cells comprises at least one diode, a transistor connected in series with the diode and another diode connected in anti-parallel relative to the transistor.

19. The bidirectional system of claim 17, wherein transistors within the same second switching cell are identical and are controlled at a same time via the control means.

20. A bidirectional system, comprising:
- a first input terminal and a second input terminal;
- a first voltage generator and a second voltage generator connected in series between the input terminals and being connected to one another at a first middle point;
- an output terminal,
- a first switching branch and a second switching branch, each of the first switching branch and the second switching branch is connected between the output terminal and a respective one of the first input terminal and the second input terminal, each of the first switching branch and the second switching branch including a plurality of first switching cells, two of the plurality of first switching cells of the first switching branch being connected to one another at a first intermediate point and two of the plurality of first switching cells of the second switching branch being connected to one another at a second intermediate point;
- a first capacitor and a second capacitor, the first capacitor being connected between the first intermediate point a second middle point, the second capacitor being connected between the second intermediate point and the second middle point, the first capacitor and the second capacitor being connected to one another at the second middle point;
- a plurality of second switching cells, a first one of the second switching cells being connected between the output terminal and the second middle point, and a second one of the second switching cells being connected between the second middle point and the first middle point; and
- control means for controlling the plurality of first switching cells and the plurality of second switching cells, wherein the control means is capable of controlling the switching of the plurality of first switching cells and the plurality of second switching cells according to a control law, and the control law is such that a current flows, for at least one given value of an alternating output voltage, through one of the first capacitor and the second capacitor in a first direction during a first phase, then in a second direction opposite the first direction through the same one of the first capacitor and the second capacitor during a second phase.

* * * * *